United States Patent
Blond et al.

(10) Patent No.: US 9,556,942 B2
(45) Date of Patent: Jan. 31, 2017

(54) DRIVE ARRANGEMENT FOR VEHICLE AUXILIARIES

(75) Inventors: Jean-Marc Blond, Saint Pierre de Chandieu (FR); Thomas Justin, Brignais (FR)

(73) Assignee: Volvo Truck Corporation, Göteborg (SE)

( * ) Notice: Subject to any disclaimer, the term of this patent is extended or adjusted under 35 U.S.C. 154(b) by 29 days.

(21) Appl. No.: 13/989,638

(22) PCT Filed: Dec. 23, 2010

(86) PCT No.: PCT/IB2010/003495
§ 371 (c)(1),
(2), (4) Date: May 24, 2013

(87) PCT Pub. No.: WO2012/085613
PCT Pub. Date: Jun. 28, 2012

(65) Prior Publication Data
US 2013/0255440 A1  Oct. 3, 2013

(51) Int. Cl.
*F16H 37/06* (2006.01)
*B60K 25/00* (2006.01)
*B60K 25/06* (2006.01)

(52) U.S. Cl.
CPC ............ *F16H 37/065* (2013.01); *B60K 25/00* (2013.01); *B60K 25/06* (2013.01); *B60K 2025/005* (2013.01); *Y10T 74/19014* (2015.01)

(58) Field of Classification Search
None
See application file for complete search history.

(56) References Cited

U.S. PATENT DOCUMENTS 8,398,515 B2 * 3/2013 Sartre .................... B60K 6/105
180/65.235
2003/0100395 A1 * 5/2003 Hiraiwa .................. B60K 6/40
475/5

(Continued)

FOREIGN PATENT DOCUMENTS

DE 19960621 A1 6/2001
FR 1273127 A 10/1961

(Continued)

OTHER PUBLICATIONS

International Search Report (Jun. 20, 2011) for corresponding International application No. PCT/IB2010/003495.

(Continued)

*Primary Examiner* — Erin D Bishop
(74) *Attorney, Agent, or Firm* — WRB-IP LLP

(57) ABSTRACT

A drive arrangement for a least one auxiliary equipment of a hybrid vehicle includes a gearbox having at least one input shaft connected to a drive internal combustion engine and one output shaft connected to driven wheels of the vehicle. The drive arrangement includes a power split device having no more than three separate input/output couplings, with a first coupling connected to the input shaft, a second coupling connected to the output shaft, and a third coupling connected to the at least one auxiliary equipment. The drive arrangement includes an auxiliary electric machine connected to one of the couplings of the power split device, and adapted to deliver torque to the at least one auxiliary equipment. The drive arrangement further includes an arrangement to disconnect the first coupling from the input shaft of the gearbox.

16 Claims, 2 Drawing Sheets

(56) References Cited

U.S. PATENT DOCUMENTS

2010/0056312 A1    3/2010  Akutsu et al.
2011/0118075 A1*   5/2011  Kawasaki ................ B60K 6/48
                                                          475/331

FOREIGN PATENT DOCUMENTS

| FR | WO 2009010819 A1 * | 1/2009 | ............ B60K 6/105 |
|---|---|---|---|
| JP | 2000-289474 | 10/2000 | |
| JP | 2003-191762 | 7/2003 | |
| JP | 2003232412 | 8/2003 | |
| JP | 2003233412 | 8/2003 | |
| JP | 2004-017890 | 1/2004 | |
| JP | 2006273516 A | 10/2006 | |

OTHER PUBLICATIONS

Patent Abstracts of Japan 2000-289474 (Oct 17, 2000) Toyota Motor Corp.
Patent Abstracts of Japan 2004-017890 (Jan. 22, 2004) Isuzu Motors Ltd.
Patent Abstracts of Japan 2003-191762 (Jul. 9, 2003) Honda Motor Co. Ltd.
Patent Abstracts of Japan 2006-273-516 (Oct. 12, 2006) Toyota Industries Corp.
Japanese Official Action (translation) (Jun. 18, 2014) for corresponding Japanese Application 2013-545512.
Japanese Official Action (translation) (Jan. 7, 2015) for corresponding Japanese Application 2013-545612.

* cited by examiner

DRIVE ARRANGEMENT FOR VEHICLE AUXILIARIES

BACKGROUND AND SUMMARY

The invention relates to a drive arrangement for at least one auxiliary equipment of a vehicle. The invention also relates to a vehicle comprising such a drive arrangement.

A vehicle such as a car or a truck comprises a driveline which includes generally at least one drive engine, which can be an electric machine or an internal combustion engine, for driving driven wheels of the vehicle. In the case of parallel hybrid electric vehicles, two drive engines are provided, one internal combustion engine and one electric machine. In most cases, the internal combustion engine is connected to the driven wheels through a gearbox having at least one input shaft connected to the drive engine and one output shaft connected to the driven wheels of the vehicle.

Vehicles may need, in particular conditions, to move with their internal combustion engine in shut down state. For example, trucks can move, on moderate slopes, with their internal combustion engine shut down, in order to save fuel and avoid friction in the engine. Such case happens frequently with hybrid vehicles when they are driven with the electric machine alone.

Auxiliary equipments, like steering pumps, alternators, air compressors or other equipments are generally mechanically driven by the internal combustion engine. In order to make sure that these equipment still operate when the internal combustion engine is shut down, known solutions replace the mechanical drive of these equipments by an electrical drive. The electrical system of such vehicles must therefore be dimensioned for heavy duties due to safety issues and to the relatively low efficiency of an electrical drive.

FR-B-1 273 127 describes a drive arrangement for an auxiliary equipment in which the auxiliary equipment can be driven simultaneously by an input shaft and by an output shaft of a gearbox, thanks to a differential. This arrangement does not permit to go on delivering torque to the auxiliary equipment when the engine is shut down and when the vehicle is stopped.

It is desirable to provide a new drive arrangement for an auxiliary equipment of a vehicle, which allows to drive one or several auxiliary equipments in various operating configurations of the vehicle, particularly when the internal combustion engine is shut down with the vehicle still moving and when the vehicle is stopped with the internal combustion engine shut down, and which does not interfere with the normal operation of the drive line of the vehicle.

An aspect of the invention concerns a drive arrangement for at least one auxiliary equipment of a vehicle, comprising a gearbox having at least one input shaft connected to a drive internal combustion engine, and one output shaft connected to driven wheels of the vehicle, the drive arrangement comprising a power split device having no more than three separate input/output couplings, whereas a first coupling is connected to the input shaft, a second coupling is connected to the output shaft, and a third coupling is connected to said at least one auxiliary equipment. This drive arrangement is characterized in that it comprises an auxiliary electric machine connected to one of the couplings of the power split device, adapted to deliver torque to said at least one auxiliary equipment, and in that it comprises means to disconnect the first coupling from the input shaft of the gearbox.

Thanks to an aspect of the invention, an auxiliary equipment driven by the internal combustion engine of the vehicle can be driven when the internal combustion engine of the vehicle is shut down. The auxiliary equipment can also be operated thanks to the electric machine when specific operating conditions of the vehicle do not permit to use a mechanical only transmission. As these specific operating conditions have a relatively short duration, the electric machine used can be downsized with respect to a drive arrangement in which the drive of the auxiliary equipments is electrical only.

According to further aspects of the invention which are advantageous but not compulsory, such a drive arrangement may incorporate one or several of the followings features:
- The first coupling is connected to the gearbox input shaft through an intermediate shaft of the gearbox which is permanently connected to the gearbox input shaft.
- The auxiliary electric machine is connected to the first coupling.
- The auxiliary electric machine is connected directly to said at least one auxiliary equipment.
- The drive arrangement comprises means, arranged between the second coupling and the output shaft, to allow the transmission of a movement from the output shaft to the second coupling only in one direction.
- The means to allow the transmission of movement from the output shaft to the second coupling in only one direction comprise a free wheel.
- The drive arrangement comprises means to selectively block the first coupling.
- The means to selectively block the first coupling comprise a free wheel connected on one side to the first coupling and on the other side to a fixed part.
- The means to selectively block the first coupling from the input shaft comprise a brake system adapted to block the rotation of the first coupling.
- The drive arrangement comprises means to control the means to disconnect the input shaft from the first coupling so that they disconnect the input shaft from the first coupling when the gearbox is in a gear changing phase or when the engine is shut down and the vehicle is stopped.
- The drive arrangement comprises means to drive said at least one auxiliary equipment through the auxiliary electric machine when the internal combustion engine is shut down and the vehicle is stopped.
- The means to control the means to disconnect and the means to drive said at least one auxiliary equipment through the auxiliary electric machine comprise at least one electronic control unit.
- The means to control the means to disconnect comprise an electronic control unit, whereas the means to drive said at least one auxiliary equipment with the auxiliary electric machine comprise a power control unit, and whereas the electronic control unit and the power control unit communicate with each other.
- Said at least one auxiliary equipment is a mechanically driven steering pump.
- The power split device is a planetary gear.

The invention also concerns, according to an aspect thereof, an automotive vehicle comprising the above-mentioned drive arrangement.

BRIEF DESCRIPTION OF THE DRAWINGS

The invention will now be explained in correspondence with the annexed figures and as an illustrative example, without restricting the invention. In the annexed figures.

DETAILED DESCRIPTION

Figure 1:
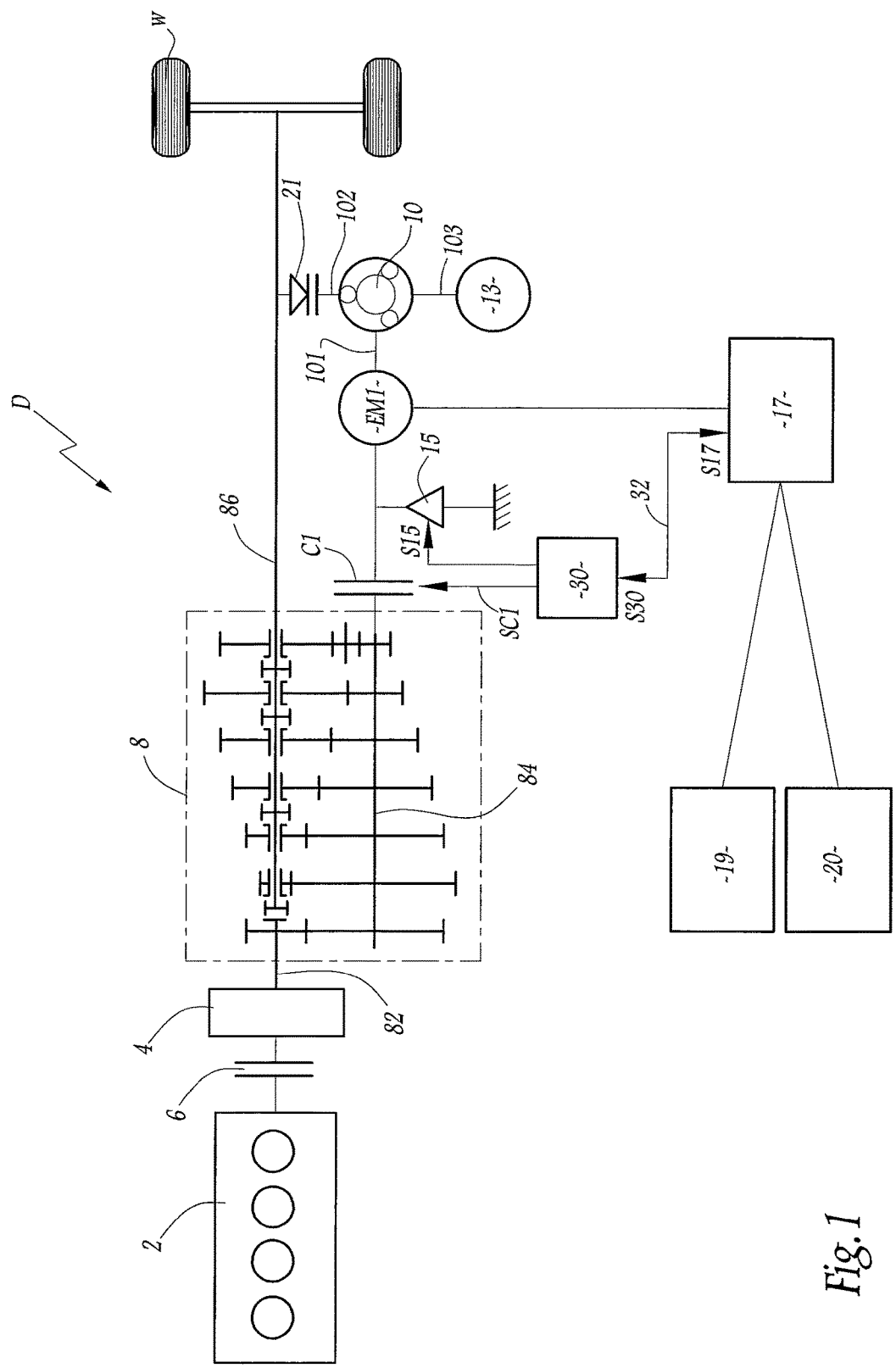
FIG. 1 is a schematic view of a drive arrangement according to a first embodiment of the invention.
Figure 2:
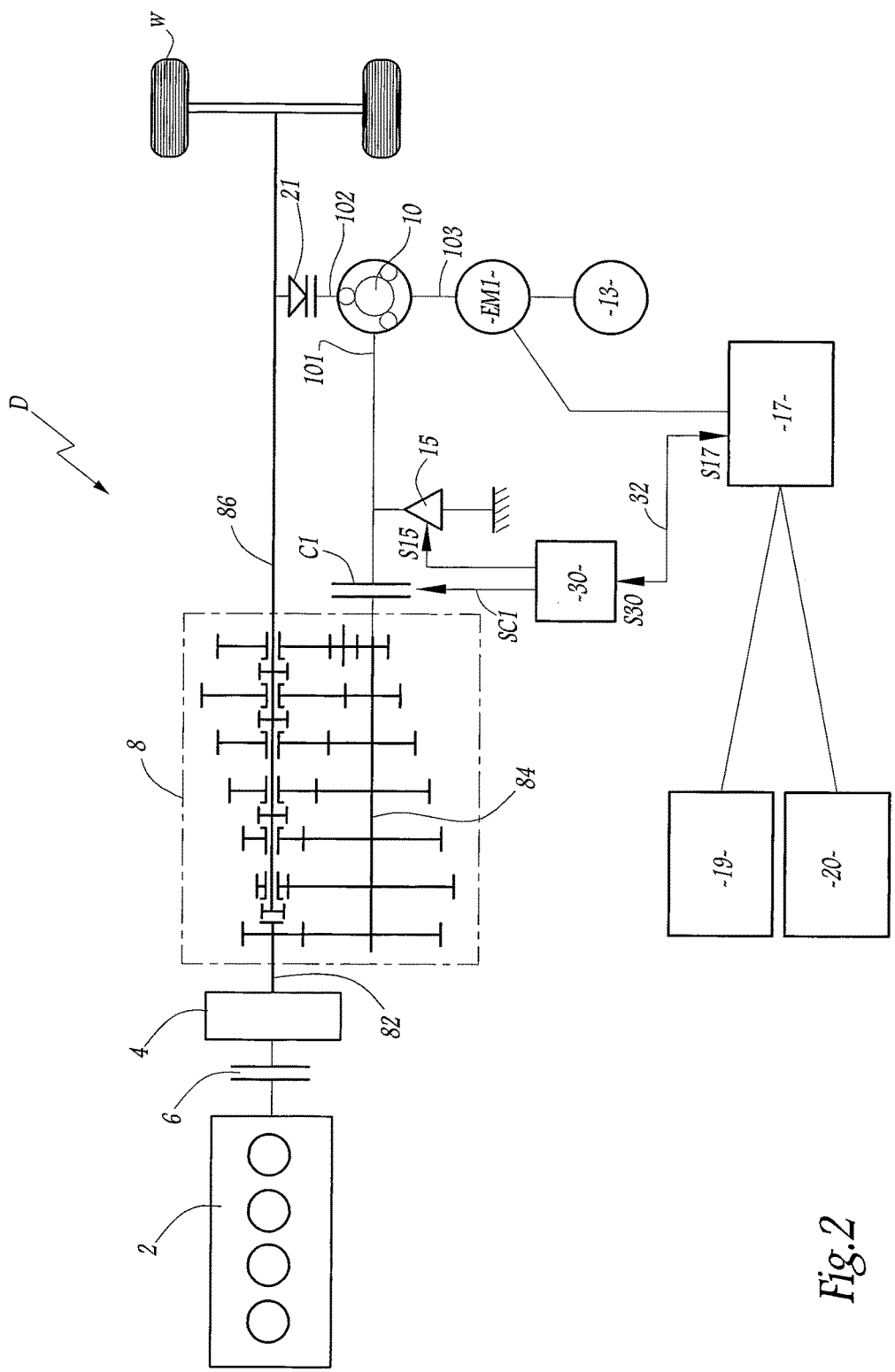
FIG. 2 is a schematic view of a drive arrangement according to a second embodiment of the invention.

On FIGS. 1 and 2 is represented a vehicle drive arrangement D which comprises a main drive internal combustion engine 2. Internal combustion engine 2 is adapted to deliver torque, preferably through a clutch 6, to an input shaft 82 of a gearbox 8. In the shown embodiment of a gearbox, input shaft 82 is drivingly and permanently connected to an intermediate shaft 84 through a set of gears. Therefore, at least in this gearbox architecture, the input and intermediate shafts 82, 84 of the gearbox are always either both drive or both non-driven, depending on whether, inter alia, the engine is running or not, the clutch 6 is closed or not, the electric machine is providing torque or not, the vehicle is moving or not, a gear is engaged or not, etc. . . . Gearbox 8 has an output shaft 86 which is aligned with input shaft 82 and rotates in parallel to intermediate shaft 84. Output shaft 86 is to be connected to driven wheels W of the vehicle, for example through a non-shown differential. Typically, the output shaft 86 rotates as long as the wheels are rotating, and vice-versa.

In the shown embodiment, the drive arrangement is of the hybrid parallel type with also a traction electric machine 4 adapted to deliver torque to input shaft 82, in addition to the torque delivered by engine 2, or to retrieve torque from the input shat 82. Traction electric machine 4 is fed with electrical current by a non-shown high-voltage battery. The invention, according to an aspect thereof can however be implemented in a conventional drive arrangement having only the internal combustion engine as a source of traction power.

The invention, according to an aspect thereof, can be implemented with any type of gearbox having an input shaft drivingly connected or connectable to the drive engine and an output shaft drivingly connected or connectable to the driven wheels of the vehicle. For example, the gearbox could have its output shaft parallel to its input shaft, with or without an intermediate shaft. It could also have a range gear on its output shaft or a splitter gear on its input shaft for multiplying the number of overall available speed ratios. It is to be noted that the gearbox 8 and the clutch 6 could be replaced by a so-called "dual-clutch" transmission or by a conventional automatic gearbox with a torque converter.

In all cases, gearbox 8 has a neutral state where input and output shafts 82 and 86 are disconnected, and a gear engaged state where input shaft 82 and output shaft 86 are drivingly connected to each other according to a speed ratio which depends on which gear is engaged.

Drive arrangement D comprises a power split device 10, which can be a planetary gear, having no more than three input/output couplings.

A conventional differential is such a type of power split device, but, in the examples shown on FIGS. 1 and 2, this device is implemented as a planetary gear. Such a gear comprises a sun wheel, a ring wheel coaxial with the sun gear, and a carrier which is coaxial with the sun and ring wheels. The sun wheel, the ring wheel and the carrier are rotatable one to the other around their common axis, and the carrier carries rotatable satellite wheels which are meshed with both the sun wheel and the ring wheel. Each of the sun wheel, of the ring wheel and of the satellite carrier can be considered as one input/output of the planetary gear. In such a gear, the speed of the three inputs/outputs are linked one to the other. Basically, the speed of one of the input/outputs is a linear combination of the speeds of the other two input/outputs, depending on the number of teeth of the elements of the planetary gear.

A first input/output coupling 101 of power split device 10 is mechanically coupled to intermediate shaft 84 and is therefore connected to input shaft 82. A second input/output coupling 102 of power split device 10 is mechanically coupled to output shaft 86. A third coupling 103 of power split device 10 is mechanically coupled to a mechanically-driven auxiliary equipment of the vehicle which, in this example, is a steering pump 13.

First coupling 101 is connected to intermediate shaft 84 through a clutch C1. The clutch is an example of a means to disconnect the first coupling from the intermediate shaft, and thereby to disconnect the first coupling from the input shaft of the gearbox.

In the shown embodiments, means are provided for selectively blocking the rotation of first coupling 101. Those means can be in the form of a brake system located to act on the first coupling between clutch C1 and power split device 10. The brake system can be embodied for example as a friction brake. The means for selectively blocking the rotation of first coupling could also be in the form of a freewheel connected on one side to the first coupling and on the other side to a fixed part, such as a gearbox casing or a part of the chassis of the vehicle. The advantage of the freewheel over the brake system is that it is a passive component which does not require any control system. The means to selectively block the rotation of the first coupling may be used to allow the rotation, of first coupling in one direction only.

Each of clutch C1 and brake system 15 is controlled, thanks to respective electronic signals SC1 and S15, for example by an electronic control unit 30.

An electric machine EM1 is connected to one of the couplings of the power split device. In embodiment of FIG. 1, it is connected to first coupling 101. It can be installed between clutch 101 and power split device 10. Electric machine EM1 is adapted to deliver torque to first coupling 101 and is fed with electrical current by a power control unit 17. Power control unit 17 is connected to an electrical energy storage system 19 and to an electric network 20 of the vehicle. Power control unit is also adapted to communicate with electronic control unit 30 thanks to electronic signals S17 and S30 emitted in a communication line 32 connecting electronic control unit 30 to power control unit 17.

Second coupling 102 is connected to output shaft 86. In the shown example, optional means are provided to allow the transmission of a movement from the output shaft 86 to the second coupling 102 only in one direction. Such means can comprise a freewheel 21 or a piloted clutch, provided between output shaft 86 and second coupling 102. Thanks to the freewheel 21, the second coupling 102 can be driven only in one direction by the output shaft. In other words, when the vehicle is reversing, the second coupling 102 is not driven. If a piloted clutch is used, it should preferably be piloted so that the clutch is opened when the vehicle is reversing.

A number of operating modes or scenarios will now be briefly discussed, which are only indicative of how the drive arrangement according to an aspect of the invention can be used advantageously, and which are by no means exhaustive thanks to the great flexibility of the arrangement for driving an auxiliary equipment.

In case the vehicle is stopped with engine 2 running, second coupling 102 is blocked, and the operation of power split device 10 induces that steering pump 13 is exclusively driven by engine 2 through the first coupling, as long as clutch 6 remains closed. The clutch C1 is also closed. Thereby, the input shaft 82 of the gearbox is driven by the engine and drives the intermediate 84 and the first coupling 101. In this case, power split device 10 acts like a reduction gear, as wheels W of the vehicle are blocked, which blocks the second coupling. In this mode, the auxiliary equipment 13 is driven at a speed which is proportional to the engine speed.

In case the vehicle is moving and engine 2 is running, gearbox 8 being in its gear engaged state, wheels W rotate together with output shaft 86. The output shaft now drives the second coupling 102. At the same time, as seen above, the first coupling 101 is driven by the engine. The operation of power split device 10 induces that the speed of the third coupling, i.e. the speed of the steering pump 13 is a linear combination between the speed of the first coupling 101 and the speed of second coupling 102, so that, in effect, it can be said that the steering pump is then driven by both the engine and the output shaft 86.

It can be mentioned that, when the drive arrangement is a parallel hybrid as shown on the figures, the traction electric machine 4 operating as a motor has the same effect as the engine 2 with respect to the operation of the power split device 10, and therefore the same effect with respect to driving the auxiliary equipment 13.

In some operating conditions of the vehicle, such as on a moderate descending slope, it can be useful to shut down internal combustion engine 2, in order to save fuel, while maintaining the speed of the vehicle by letting the vehicle move on its momentum. Clutch 6 is then opened. In this case, if the gearbox 8 is set to neutral, the first coupling 101 is not driven anymore by intermediate shaft 84. The torque delivered to steering pump 13 comes only from the rotation of driven wheels W through free wheel 21 and second coupling 102. Brake system 15 is used in this case to block the rotation of first coupling 101, so that power split device 10 acts like a reduction gear. Here, the speed of the steering pump is proportional to the vehicle speed. Nevertheless, if the speed provided by the second input alone is not sufficient, then the electrical machine EM1 can be controlled to drive the first coupling, so that the speed of the steering pump 13 is increased, as it is then a linear combination of the speed of the first coupling 101 and the speed of second coupling 102.

When a gear change is needed and gearbox 8 goes in neutral state, first coupling 101 is preferably disconnected from intermediate shaft 84 thanks to clutch C1, so as to avoid any damage to the gearbox 8 which could be due to a rotation of intermediate shaft 84 during the gear change. Simultaneously, first coupling 101 is blocked by the means for selectively blocking the first coupling.

In a hybrid vehicle as shown on the figures, the vehicle may be accelerated from standstill using only the electric machine, the combustion engine 2 being stopped. In such a case, while the vehicle is at standstill and during the first instants of such acceleration, there is not enough speed available from either the input or the output shaft of the gearbox to drive the auxiliary at a speed at which it can perform its function properly. In the case of a steering pump this means that no power assistance can be given to the driver to turn the steering wheels. Therefore, to operate steering pump 13, electric machine EM1 is fed with electrical current by power control unit 17 so as to deliver torque to first coupling 101 and, through power split device 10, to third coupling 103 and to steering pump 13. Clutch C1 is opened. A similar scenario exists when the vehicle is at standstill with its engine stopped, for example because it is parked.

In a second embodiment of an aspect of the invention represented on FIG. 2, the same elements as in the first embodiment have the same references and work in the same way. In this second embodiment, electric machine EM1 is connected directly to the auxiliary equipment, for example between pump 13 and power split device 10.

In the various operating configurations of the drive arrangement D of the two embodiments mentioned hereabove, the communication between power control unit 17 and electronic control unit 30 via signals S17 and S30 permits to synchronize the operation of clutch C1, brake system 15 and electric machine EM1. According to an alternate embodiment, drive arrangement D can comprise a single control unit adapted to pilot clutch C1, brake system 15 and electric machine E1.

The invention, according to an aspect thereof, can also be implemented to drive other types of auxiliary equipments, such as air compressors, or to form a power take-off.

The drive arrangement of an aspect of the invention is also adapted to drive several auxiliary equipments simultaneously.

The invention claimed is:

1. A drive arrangement for a least one auxiliary equipment of a vehicle, the vehicle comprising a gearbox having at least one input shaft connected to a drive internal combustion engine and the gearbox having an output shaft connected to driven wheels of the vehicle, the drive arrangement comprising
a power split device having no more than three separate input/output couplings, the no more than three separate input/output couplings of the power split device including
a first coupling connected to the input shaft,
a second coupling connected to the output shaft,
a third coupling connected to the at least one auxiliary equipment,
wherein the drive arrangement comprises an auxiliary electric machine connected to one of the couplings of the power split device, the auxiliary electric machine being adapted to deliver torque to the at least one auxiliary equipment, wherein the drive arrangement comprises means to mechanically disconnect the first coupling from the input shaft of the gearbox, wherein the gearbox is of a type having a plurality of engageable and disengageable gears, and having a neutral state where the input and the output shafts are disconnected and a gear engaged state wherein the input and output shafts are drivingly connected to each other according to a speed ratio that depends upon which gears of the plurality of gears are engaged, and wherein the first coupling is connected to the gearbox input shaft through an intermediate shaft of the gearbox which rotates parallel with the output shaft and which is permanently connected to the gearbox input shaft.

2. The drive arrangement according to claim 1, wherein the auxiliary electric machine is connected to the first coupling.

3. The drive arrangement according to claim 1, wherein the auxiliary electric machine is connected directly to the at least one auxiliary equipment.

4. The drive arrangement according to claim 1, wherein the drive arrangement comprises means to control the means to disconnect the input shaft from the first coupling so that the input shaft is disconnected from the first coupling when the gearbox is in a gear changing phase or when the engine is shut down and the vehicle is stopped.

5. The drive arrangement according to claim 4, wherein the means to control the means to disconnect comprises at least one electronic control unit.

6. The drive arrangement according to claim 4, wherein the drive arrangement comprises means to drive the at least one auxiliary equipment through the auxiliary electric machine when the internal combustion engine is shut down, and wherein the means to control the means to disconnect the input shaft from the first coupling comprises an electronic control unit, wherein the means to drive the at least one auxiliary equipment with the auxiliary electric machine comprises a power control unit, and wherein the electronic control unit and the power control unit communicate with each other.

7. The drive arrangement according to claim 1, wherein the drive arrangement comprises means to drive the at least one auxiliary equipment through the auxiliary electric machine when the internal combustion engine is shut down.

8. The drive arrangement according to claim 1, wherein the power split device is a planetary gear.

9. A drive arrangement for a least one auxiliary equipment of a vehicle, the vehicle comprising a gearbox having at least one input shaft connected to a drive internal combustion engine and the gearbox having an output shaft connected to driven wheels of the vehicle, the drive arrangement comprising
  a power split device having no more than three separate input/output couplings, the no more than three separate input/output couplings of the power split device including
    a first coupling connected to the input shaft,
    a second coupling connected to the output shaft,
    a third coupling connected to the at least one auxiliary equipment,
  wherein the drive arrangement comprises an auxiliary electric machine connected to one of the couplings of the power split device, the auxiliary electric machine being adapted to deliver torque to the at least one auxiliary equipment, wherein the drive arrangement comprises means to mechanically disconnect the first coupling from the input shaft of the gearbox, and wherein the gearbox is of a type having a plurality of engageable and disengageable gears, and having a neutral state where the input and the output shafts are disconnected and a gear engaged state wherein the input and output shafts are drivingly connected to each other according to a speed ratio that depends upon which gears of the plurality of gears are engaged, wherein the drive arrangement comprises means, arranged between the second coupling and the output shaft, to allow transmission of a movement from the output shaft to the second coupling only in one direction.

10. The drive arrangement according to claim 9, wherein the means to allow transmission of the movement from the output shaft to the second coupling in only one direction comprises a freewheel.

11. A drive arrangement for a least one auxiliary equipment of a vehicle, the vehicle comprising a gearbox having at least one input shaft connected to a drive internal combustion engine and the gearbox having an output shaft connected to driven wheels of the vehicle, the drive arrangement comprising
  a power split device having no more than three separate input/output couplings, the no more than three separate input/output couplings of the power split device including
    a first coupling connected to the input shaft,
    a second coupling connected to the output shaft,
    a third coupling connected to the at least one auxiliary equipment,
  wherein the drive arrangement comprises an auxiliary electric machine connected to one of the couplings of the power split device, the auxiliary electric machine being adapted to deliver torque to the at least one auxiliary equipment, wherein the drive arrangement comprises means to mechanically disconnect the first coupling from the input shaft of the gearbox, and wherein the gearbox is of a type having a plurality of engageable and disengageable gears, and having a neutral state where the input and the output shafts are disconnected and a gear engaged state wherein the input and output shafts are drivingly connected to each other according to a speed ratio that depends upon which gears of the plurality of gears are engaged, wherein the drive arrangement comprises means to selectively block rotation of the first coupling.

12. The drive arrangement according to claim 11, wherein the means to selectively block rotation of the first coupling comprises a freewheel connected on one side of the freewheel to the first coupling and on another side of the freewheel to a fixed part.

13. The drive arrangement according to claim 11, wherein the means to selectively block rotation of the first coupling comprises a brake system adapted to block the rotation of the first coupling.

14. A drive arrangement for a least one auxiliary equipment of a vehicle, the vehicle comprising a gearbox having at least one input shaft connected to a drive internal combustion engine and the gearbox having an output shaft connected to driven wheels of the vehicle, the drive arrangement comprising
  a power split device having no more than three separate input/output couplings, the no more than three separate input/output couplings of the power split device including
    a first coupling connected to the input shaft,
    a second coupling connected to the output shaft,
    a third coupling connected to the at least one auxiliary equipment,
  wherein the drive arrangement comprises an auxiliary electric machine connected to one of the couplings of the power split device, the auxiliary electric machine being adapted to deliver torque to the at least one auxiliary equipment, wherein the drive arrangement comprises means to mechanically disconnect the first coupling from the input shaft of the gearbox, wherein the gearbox is of a type having a plurality of engageable and disengageable gears, and having a neutral state where the input and the output shafts are disconnected and a gear engaged state wherein the input and output shafts are drivingly connected to each other according to a speed ratio that depends upon which gears of the plurality of gears are engage, wherein the at least one auxiliary equipment is a mechanically driven steering pump.

15. A drive arrangement for a least one auxiliary equipment of a vehicle, the vehicle comprising a gearbox having at least one input shaft connected to a drive internal combustion engine and the gearbox having an output shaft connected to driven wheels of the vehicle, the drive arrangement comprising a power split device having no more than three separate input/output couplings, the no more than three separate input/output couplings of the power split device including a first coupling connected to the input shaft,
a second coupling connected to the output shaft,
a third coupling connected to the at least one auxiliary equipment, wherein the drive arrangement comprises an auxiliary electric machine connected to one of the couplings of the power split device, the auxiliary electric machine being adapted to deliver torque to the at least one auxiliary equipment, wherein the drive arrangement comprises means to mechanically disconnect the first coupling from the input shaft of the gearbox, and wherein the auxiliary electric machine is connected directly to the at least one auxiliary equipment.

16. A drive arrangement for a least one auxiliary equipment of a vehicle, the vehicle comprising a gearbox having at least one input shaft connected to a drive internal combustion engine and the gearbox having an output shaft connected to driven wheels of the vehicle, the drive arrangement comprising a power split device having no more than three separate input/output couplings, the no more than three separate input/output couplings of the power split device including a first coupling connected to the input shaft,
a second coupling connected to the output shaft,
a third coupling connected to the at least one auxiliary equipment, wherein the drive arrangement comprises an auxiliary electric machine connected to one of the couplings of the power split device, the auxiliary electric machine being adapted to deliver torque to the at least one auxiliary equipment, wherein the drive arrangement comprises means to mechanically disconnect the first coupling from the input shaft of the gearbox, wherein the drive arrangement comprises means to selectively block rotation of the first coupling.

* * * * *